United States Patent [19]

Stephenson et al.

[11] 4,082,236
[45] Apr. 4, 1978

[54] FREE PULL WEB SENSITIVE RETRACTOR

[75] Inventors: Robert L. Stephenson, Sterling Heights, Mich.; Yogendra S. Loomba, Knoxville, Tenn.

[73] Assignee: Allied Chemical Corporation, Morris Township, N.J.

[21] Appl. No.: 753,762

[22] Filed: Dec. 23, 1976

[51] Int. Cl.$^2$ .................. A62B 35/02; B65H 75/48
[52] U.S. Cl. .................. 242/107.4 B; 242/107.4 D
[58] Field of Search .................. 242/107.4 R–107.4 E; 297/388; 280/744–747

[56] References Cited

U.S. PATENT DOCUMENTS

| | | | |
|---|---|---|---|
| 3,604,654 | 9/1971 | Stoffel | 242/107.4 D |
| 3,632,056 | 1/1972 | Hibbard | 242/107.4 B |
| 3,632,058 | 1/1972 | Stoffel | 242/107.4 B |
| 3,741,496 | 6/1973 | Beller | 242/107.4 B X |
| 3,862,726 | 1/1975 | Ulrich et al. | 242/107.4 B |
| 3,883,089 | 5/1975 | Close | 242/107.4 B |

Primary Examiner—Harvey C. Hornsby
Assistant Examiner—John M. Jillions
Attorney, Agent, or Firm—Roger H. Criss

[57] ABSTRACT

A reel-type retractor for a vehicle safety belt designed for halting rotation of the reel in response to an inertial device, and having the added feature that the belt can be withdrawn from the retractor for buckling up without interference from the locking pawl. A clutch, rotating with the reel, is shaped to restrain a biased webbing follower, and to block the pawl from engaging a ratchet wheel serving as a flange for the reel, thus permitting any rate of withdrawal of the belt without locking the reel. When the user buckles up and the safety belt is retracted slightly as occurs in buckling, the clutch rotates to release the webbing follower which then moves toward the diminished roll of webbing and prevents the clutch from regaining its blocking position, thus allowing the pawl to engage the ratchet wheel in response to the inertial device.

11 Claims, 7 Drawing Figures

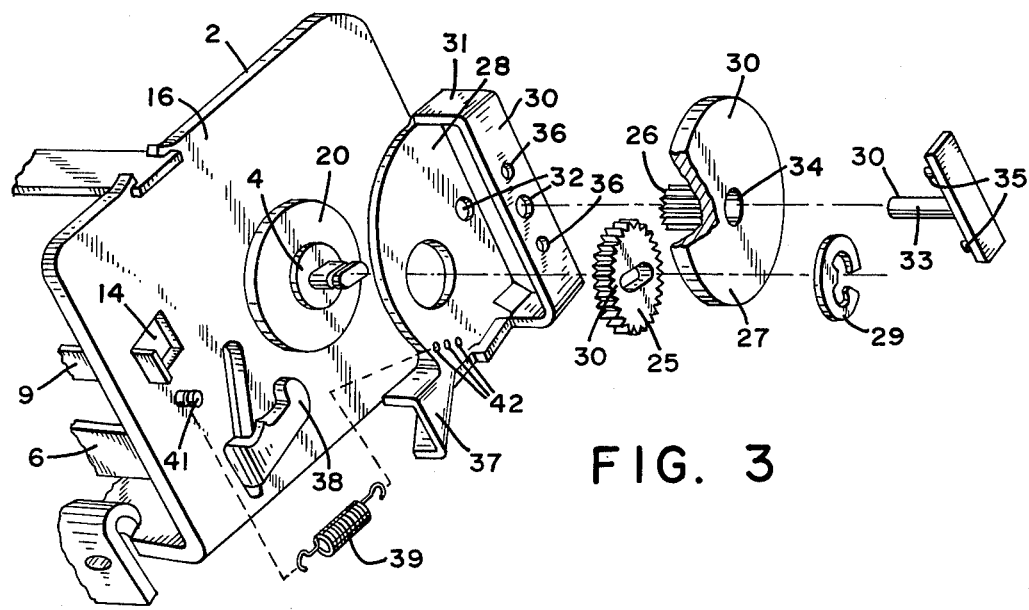
FIG. 3
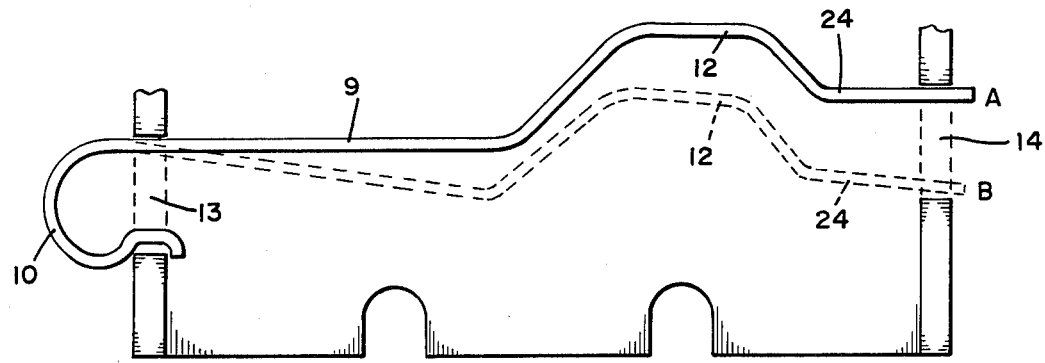
FIG. 4
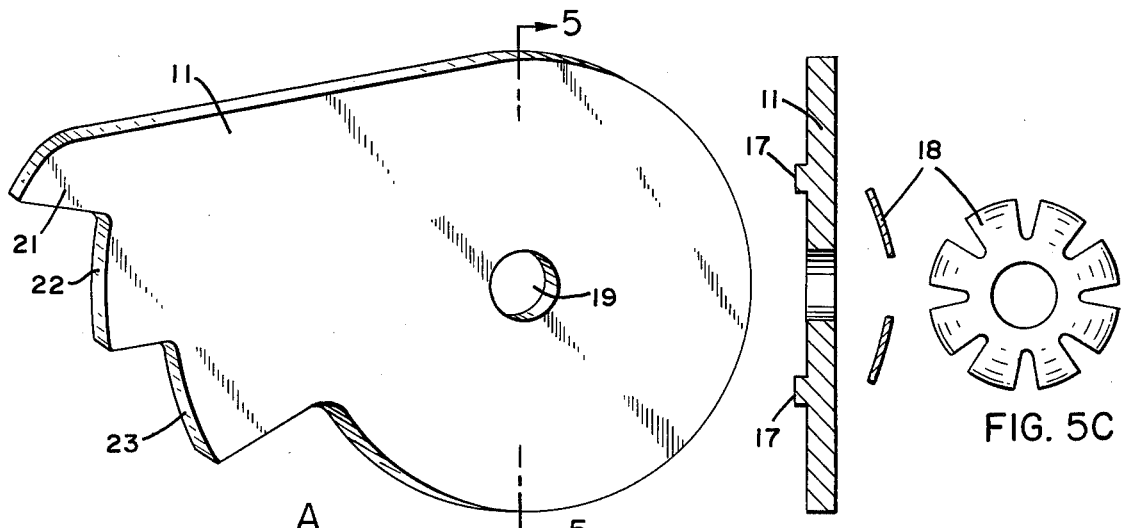
FIG. 5A
FIG. 5B
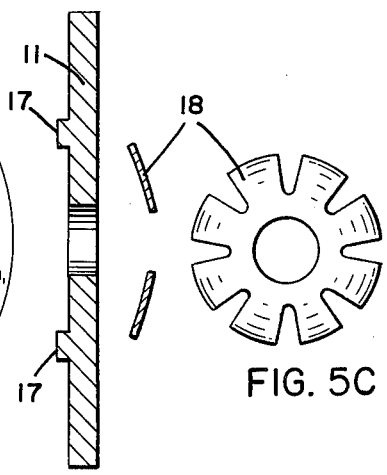
FIG. 5C

FREE PULL WEB SENSITIVE RETRACTOR

CROSS-REFERENCE TO RELATED APPLICATIONS

This application is related to co-filed application, Ser. No. 753,764.

BACKGROUND OF THE INVENTION

1. Field of the Invention

This invention relates to vehicle safety belt retractors and more particularly to those which permit withdrawal of the seat belt for buckling or to accommodate the body motions of the individual using the belt, but which lock to restrain the wearer when conditions require it in the interests of safety.

2. Description of the Prior Art

Many reel-type safety seat belt retractors are known which employ an inertial device for triggering a pawl into locking engagement with the ratchet teeth on the reel in response to accelerated rotation of the reel in the unwind direction. Also different methods have been suggested for permitting the belt to be withdrawn for belting without activating the inertial device. This is commonly accomplished by designing the inertial device to respond only to relatively high rates of acceleration of the reel. This entails a compromise between sensitivity and convenience, often to the detriment of both.

It is an object of this invention to provide a safety seat belt retractor in which the belt can be withdrawn for buckling without triggering the inertial device no matter how vigorously it is withdrawn from the retractor, or how far it is extended on the first pull, yet without in any way affecting the sensitivity of the inertial device.

SUMMARY OF THE INVENTION

The present invention is a reel-type retractor wherein the pawl engages the teeth of the ratchet wheel in response to an inertial device, but with the feature that the belt can initially be withdrawn from the retractor an any rate and in any amount without locking the reel. This is achieved by using a clutch and a cooperating webbing follower. The clutch is sandwiched between the ratchet wheel and a support wall. It is rotatable on the shaft and biased against the ratchet wheel for limited rotation therewith. The webbing follower, biased toward the roll of belting on the reel for sliding contact therewith, extends from one support wall to the other, and is fixed in the wall most distant from the clutch.

The clutch is so shaped that when the webbing follower is in contact with a substantially full roll of webbing, and the webbing is initially withdrawn, the clutch rotates without striking the webbing follower, to a position where it blocks the pawl from engaging the ratchet wheel. In this position it also restrains the webbing follower from following the diminishing roll of webbing. When the diameter of the roll of webbing is substantially reduced, however, as when the belt is buckled about the user, and when the belt is retracted even a slight amount, which naturally occurs in the process of buckling up, the clutch rotates with the reel, thus releasing the webbing follower which then moves toward the roll of webbing in response to its bias. In this unrestrained situation, the webbing follower is now positioned to prevent the clutch from rotating to its former position to block the pawl, thus allowing the pawl to engage the ratchet wheel when triggered by the inertial device.

The type of inertial device, of which there are many varieties, is unimportant. That shown in the drawings is a type using an inertial wheel, the sensitivity of which can be varied to suit requirements by selecting one of several anchor points on the rotatable device, for the biasing spring.

In the preferred embodiment of our invention the improvement of the reel-type seat belt retractor comprises a clutch sandwiched between the ratchet wheel and the support wall, and biased toward the ratchet wheel for rotation therewith. The clutch has a portion extending in the general direction of the pawl, said extending portion comprising a first arc segment having a radius which just exceeds that of the ratchet wheel (preferably by less than 2 millimeters), and a second adjacent arc segment having a radius greater than the first. The first arc segment is positioned with respect to the second segment as to lead the second as the clutch rotates in the unwind direction.

By an arc segment we mean that the outer edge of the extending portion of the clutch is shaped as a small section of a circle having a radius measured from the point about which the clutch rotates, which corresponds with the axis of the shaft. The adjacent arc segments comprise two steps, that of lesser radius, having a radius just greater than that of the ratchet wheel with which it rotates.

Preferably, adjacent to the arc segment of greater radius, there is a further projection to act as a stop, for limiting the angle through which it is possible for the clutch to rotate.

A webbing follower is attached to the support wall most distant from the clutch, with its other end extending through an opening in the opposite support wall, said opening being sufficiently large as to permit limited motion of the otherwise free end of the webbing follower toward and away from the reel.

By the term "webbing follower" we mean a movable structure substantially parallel to the shaft, having a portion extending toward the roll of belting which we refer to as webbing, for sliding contact therewith. This webbing follower, attached as aforesaid at one support wall, is preferably flexible, and biased toward the roll of belting, so that within the limits permitted by the dimensions of the opening into which its free end extends, it follows the surface of the roll of webbing as it increases or decreases in diameter as the belt is wound or unwound on the reel. It is not essential that the webbing follower be flexible, as the same purpose would be achieved were it rigid, but hinged or flexible at the support wall or at some point along its length, and biased toward the roll of webbing on he reel.

The limited movement of the webbing follower, resulting from its sliding contact with the roll of webbing on the reel, provides a passageway of varying dimension between the follower and the ratchet reel, such, that with the initial withdrawal of the belt, this passageway is sufficient to allow the first and second arc segment of the clutch, but not the projecting stop, to rotate beneath the webbing follower. This is the first position of the clutch wherein the first arc segment blocks the pawl from engaging the ratchet in response to the inertial device, and the second arc segment restrains the webbing follower, against its bias, from completing its travel toward the reel as the roll of webbing is reduced in diameter by withdrawal of the belt.

If, when the belt has been withdrawn for buckling it is permitted to retract even a small amount, which retraction takes place inadvertently during the buckling operation, the clutch rotates with the reel to release its restraint on the webbing follower. The webbing follower then moves toward the diminished roll of webbing in response to its bias, thus reducing the passageway between the webbing follower and the ratchet wheel to the degree, that although the first arc segment can rotate to a point beneath it, the second segment cannot, thus holding the clutch to its second position wherein the first arc segment cannot block the pawl. The pawl is thus free for a triggering response to the inertial device.

It can be seen that the angle subtended by an arc segment is not critical as long as the segments are of sufficient length to provide the above described action. Although the extending portion of the clutch is preferably shaped in the form of step-like arc segments, it should also be clear that rather than arc segments, steps, shoulders or any other shape which will provide the first and second positions of the clutch under the described circumstances would be satisfactory.

When the clutch is rotated in the unwind direction, the angle of rotation is limited by the projecting stop, in striking the webbing follower. In the wind direction, rotation of the clutch is limited in consequence of the projecting stop striking a projection from the support frame such as a brace, bracket or other obstruction.

BRIEF DESCRIPTION OF THE DRAWINGS

FIG. 3 is a partial view of the retractor including an exploded view of the inertial assembly.

FIG. 4 is an enlarged view of the webbing follower in position A to restrain the clutch to its second position, thereby rendering the pawl responsive to the inertial device. Position B shown in phantom, permits the clutch to rotate to its first position wherein it blocks the pawl from engaging the ratchet reel, thus making the inertial device ineffective.

FIG. 5A is a side view of the clutch.

FIG. 5B is a cross-section of the clutch of FIG. 5A taken through line 5—5.

FIG. 5C is one of several possible forms of clutch springs.

DETAILED DESCRIPTION OF THE PREFERRED EMBODIMENT WITH REFERENCE TO THE DRAWINGS

Figure 1:
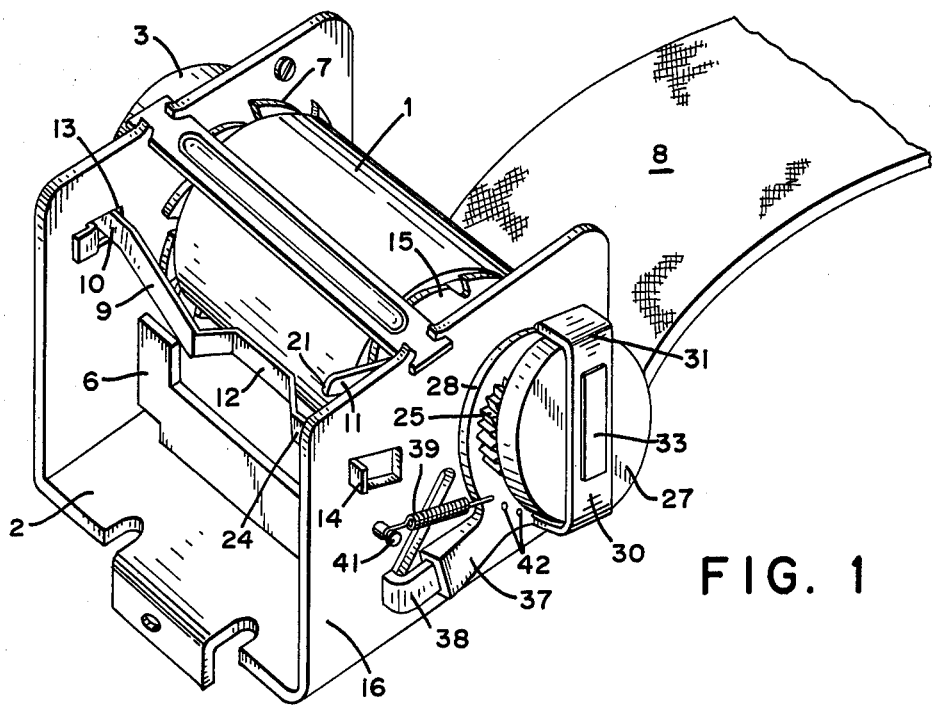
FIG. 1 is a perspective view of the free pull web sensitive seat belt retractor positioned to show the webbing follower and the inertial assembly.
Figure 2:
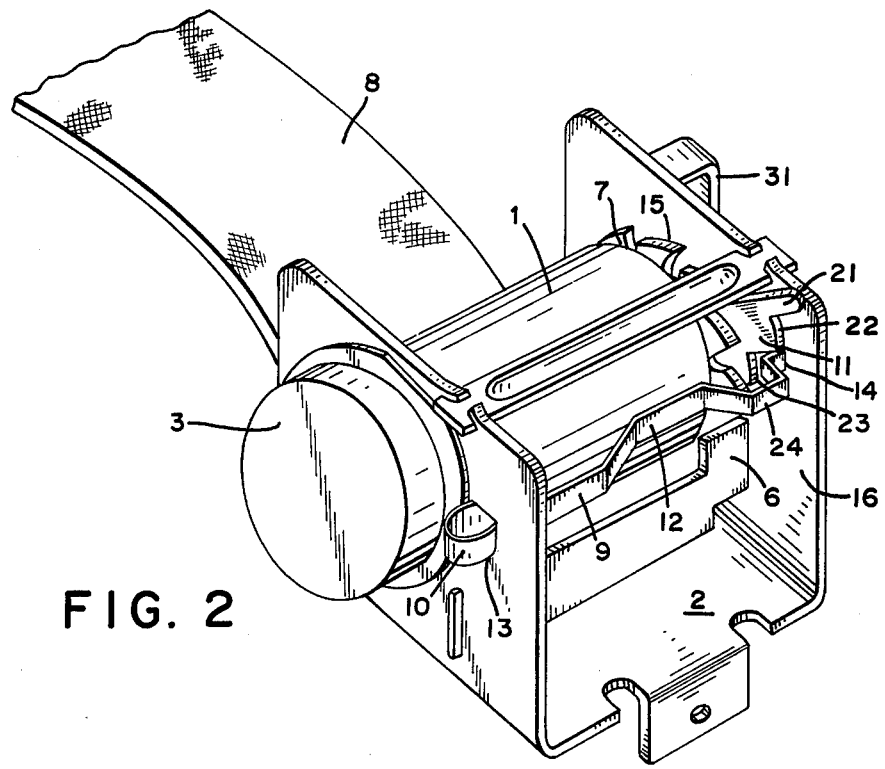
FIG. 2 is a perspective view of the same retractor positioned to show the opposite side, and reveal the relative position of the web follower and the clutch.

With reference to the five figures, our invention is directed to a seat belt retractor of the type having a flanged rotatable webbing reel 1 journaled in a supporting frame 2, and spring biased toward a fully wound condition by biasing means 3. An extention of the reel axle 4 of the webbing reel connects to an inertial device 30 for tripping locking pawls 6 into locking engagement with ratchet teeth 7 on the periphery of the flanges of the webbing reel 1, when a sudden pull is applied to the webbing 8. The inertial device is sensitive to a sudden increase in the rate of acceleration of the reel.

A novel feature of this seat belt retractor is the additional structure provided to permit the belt to be withdrawn from the reel initially, for buckling, without the annoyance of having the reel lock in response to the inertial device 30, no matter how vigorously the belt is first extended, or for how great a distance. This ability to block the locking mechanism at the time the belt is withdrawn for buckling is accomplished by the action of an inwardly biased webbing follower 9 which, when the reel is substantially full of webbing, permits the clutch 11 to rotate to a first position wherein an arc segment 23, being an extended portion of the clutch, is disposed to block the pawls 6 from engaging the ratchet wheels 7. In this first position of the clutch, a second adjacent arc segment 22 having a greater radius than arc segment 23, has also passed under the webbing follower where it remains, being at the end of its travel in the unwind direction. As the webbing is withdrawn and the roll of belting diminishes, this arc segment 22 prevents the webbing follower from following the diminishing roll of webbing. When the extended webbing retracts slightly, as normally occurs during the belting operation, the clutch rotates to its second position, releasing the webbing follower 9, which then moves toward the diminishing roll of belting. Any further extension of the webbing leaves the clutch in the second position where it is now held by the webbing follower, thus leaving the pawls free to respond to the action of the inertial device.

The action of the webbing follower is as follows: When the reel is substantially full of webbing, the contacting portion 12 of the follower 9 is pressed against the outer surface of the roll of webbing. In the drawings this follower is shown as fabricated of spring metal, and extends from opening 13 in the sidewall of support frame 2 on the side opposite the inertial device. This is best shown in FIG. 4. The webbing follower has been secured in opening 13 and loop 10 partially contributes to the inward bias of the webbing follower, the balance being provided by the follower itself. Preferably this follower is fabricated of spring steel. The free end of the webbing follower protrudes through rectangular opening 14 which provides the follower with a limited degree of movement toward and away from the reel, depending on the amount of webbing on the reel at any particular moment.

It should be understood that the form and material of construction of the webbing follower is not critical. It may be either flexible or rigid, and the bias can be supplied by its own elasticity or by the action of separate biasing means such as a coiled spring. The follower can be fabricated of metal or of polymeric or other materials.

Clutch 11, best shown in FIG. 5, is rotatable on the axle or shaft of the reel 1, which shaft is fixed to the reel. The clutch which is rotatable on this shaft, is sandwiched between ratchet wheel 15 of the reel and the sidewall 16 of the support frame. This clutch has a face 17 for cooperating with the outer face of ratchet wheel 15. Spring 18 also encircles the shaft of the reel and is positioned between clutch 11 and sidewall 16 to bias the clutch against the outer surface of flange 15 of the reel. The clutch and reel consequently turn together until the clutch is restrained, in which case slippage occurs between the ratchet wheel 15 and the clutch. The spring as shown is a concave spring metal disc 18, with slots extending from the periphery toward the central opening. It should be understood that other biasing means will be equally effective, such as a conically shaped coiled spring, or a washer of resilient composition.

Clutch 11 as shown is substanially circular in form except for an extending portion which comprises projecting stop 21 and two arc segments or steps, 22 and 23.

In the retractor's retracted position the roll of webbing presses the webbing follower 9 against its bias, to the outer limit permitted by opening 14 through which the free tip of the webbing follower extends. Now if the webbing is withdrawn for buckling, the clutch rotates with the reel until halted by stop 21 when it contacts section 24 of the webbing follower. To reach this degree of rotation arc segments 22 and 23 of the clutch have, in rotating, cleared section 24 of the webbing follower. Because of stop 21, arc segment 22 has come to rest beneath section 24 of the webbing follower, and arc segment 23 lies between locking pawl 6 and the ratchet teeth 7, thus blocking the pawls from engaging the ratchet teeth. No matter how much webbing is withdrawn, the tendency of the clutch to rotate with the reel causes it to remain in this blocking position. In this position arc segment 22 also restrains the webbing follower against its bias, from completing its travel, as the diameter of the roll of webbing diminishes. The withdrawal of the webbing can be halted and started again without losing this blocking action. However, when the webbing is extended, and is permitted to retract even a very slight amount, the clutch rotates with the reel, thus extracting arc segment 23 of the clutch from its position to block the locking pawls 6, and simultaneously extracting the adjacent arc segment 22 from its position beneath the webbing follower, freeing the follower to move toward the diminishing roll of webbing on the reel in response to its bias. If now the webbing is further withdrawn even a very slight amount, the clutch will again rotate with the reel, but this time its motion will be stopped when the arc segment 22 of the clutch is obstructed by the webbing follower, since in its movement toward the reel, the passageway beneath the follower has been reduced. In this second position, arc segment 23 no longer blocks the locking pawls, and they are free to engage the ratchets as soon as urged into locking position by the inertial device.

The inertial device per se is not novel except in the details of its construction. It is shown in the exploded view of FIG. 3. Gear 25 is keyed to shaft extension 4 and meshes with pinion 26 which is fixed to rotatable inertial wheel 27. The ratio of these two gears, 25 and 26 is selected to give the desired degree of sensitivity. The fewer the number of teeth of pinion 26 with respect to the teeth of gear 25, the greater the sensitivity. To assemble, rotatable gear support member 28 is placed over shaft extension 4 to rest on shoulder 20. Gear 25 is keyed to shaft extension 4 and secured by lock ring 29 which slips into concentric groove on the extended portion of reel shaft 4. Now, inertial wheel 27 with attached pinion 26 is placed beneath bridge member 31 which is an integral part of support member 28. The pinion 26 is positioned to mesh with gear 25 and is aligned with opening 32 in the support member 28. Now bearing pin 33 is inserted through openings 32 of the support member, and opening 34 of the inertial wheel. Preferably this bearing pin is fabricated of nylon, Teflon or other similar polymeric material which provides a bearing surface requiring no lubrication. Two extending protuberances 35 are shaped to snap into openings 36. Encompassing lever 37 fits over the extending arm 38 of the pawl bar, so that rotation of the support member 28 will rock the pawls in or out of engagement with the ratchets 7. Small coiled spring 39 is attached to grooved pin 41, and extends to one of three openings 42. Increasing the tension of the spring by selecting an opening more distant from pin 41 decreases the sensitivity of the inertial device.

In operation, the normal slow movements of the belted passenger cause no restraint since the coiled spring 39 holds the supporting member 28 in a position to maintain the locking pawls 6 out of locking engagement with the ratchets. However, when the clutch is not in position to restrain the locking pawls as in the case when the webbing is in use as a safety restraint, and when the passenger suddenly lurches against the webbing as in a vehicle invloved in a collision, the inertia of the inertial wheel causes the pinion to resist rapid change. Gear 25, applying a sudden force to the periphery of the initially resistent pinion 26, applies a rotating force to the supporting member 28 into which, together with the attached inertial wheel, it is journaled. This tendency for the support member to rotate about the reel shaft is in opposition to spring 39, and if the force is sufficient to overcome this bias, because of the abruptness of the vehicles deceleration, the rotating support member acting on extending arm 38 of the locking pawls 6, moves the pawls into locking engagement with the reel.

While we have described preferred embodiments of our invention, it will be understood that various modifications can be made in the seat belt retractor without departing from the spirit of the invention.

We claim:

1. In a safety belt retractor comprising a support, a reel mounted for rotation on said support, seat belt webbing attached to and wound up on said reel, at least one ratchet wheel associated with said reel, and pawl means engageable with said ratchet wheel in response to actuation by an inertial device to prevent rotation of said reel in a belt extending direction, the improvement which comprises:
   (a) follower means mounted in said support and biased towards said reel, said follower means comprising:
      (i) a web contact portion for contacting said webbing when said webbing is substantially fully wound up on said reel, and
      (ii) a clutch contact portion; and
   (b) clutch means mounted for limited rotation with said reel, said clutch means being movable to a first position upon initial extension of said webbing from said reel, to a second position upon rotation of said reel in a retracting direction subsequent to said initial extension and to a third position upon additional extension of said webbing from said reel following said rotation in a retracting directon, said clutch means comprising:
      (i) a first portion engageable with said pawl means and blocking said pawl means from engaging said ratchet wheel when said clutch means is in its first position, said first portion no longer blocking said pawl means when said clutch means is in its second position; and
      (ii) a second portion engageable with said clutch contact portion of said follower means when said clutch means is in its first position at which said second portion blocks said follower means from movement towards said reel, said second portion no longer blocking said follower means when said clutch means is in its second position, and said second portion engageable with said clutch contact portion when said clutch means is in its third position, thereby preventing said first portion from engaging and blocking said pawl means.

2. The retractor of claim 1 wherein said clutch means further comprises:

(iii) a third portion engageable with said clutch contact means of said follower means when said clutch is in its first position and thereby locating said first and second portions in their respective positions, said third portion no longer being in engagement with said clutch contact means when said clutch means is in its second position.

3. The retractor of claim 1 wherein said first and second portions of said clutch means are in the form of arc segments, said first portion arc segment having a radius less than the radius of said second portion arc segment.

4. The retractor of claim 1 wherein said clutch means is mounted on a shaft on which said reel is mounted and the distance between said first portion of said clutch means and said shaft is less than the distance between said second portion of said clutch means and said shaft.

5. The retractor of claim 4 wherein said clutch means is located between said ratchet wheel and an adjacent support wall of said support and is in contact with and biased toward said ratchet wheel.

6. The retractor of claim 5 wherein said follower means is in the form of a flexible elongated member mounted substantially parallel to said reel and said web contact portion is in sliding contact with said webbing on said reel.

7. The retractor of claim 6 including means on said adjacent support wall for limiting movement of said follower means towards said reel.

8. The retractor of claim 7 wherein said inertial device is a normally stationary, movable means biased towards its normally stationary position and being in contact with an integral movable arm of said pawl means, said inertial device moving said pawl means into engagement with said ratchet wheel in response to an accelerated rate of rotation of said reel, whereby when said clutch means is in its first position, said webbing may be withdrawn from said retractor at any rate and in an amount without engaging said ratchet wheel with said pawl means.

9. The retractor of claim 6 wherein one end of said follower means is mounted in a support wall opposite from said adjacent support wall and the opposite end of said follower means extends into an aperture in said adjacent support wall, the periphery of said aperture comprising said means for limiting movement of said follower means.

10. The retractor of claim 9 wherein said clutch contact portion of said follower means is adjacent to said opposite end of said follower means and is also adjacent to said web contact portion of said follower means, said clutch contact portion being out of contact with said second portion of said clutch means when said webbing is fully wound on said reel due to contact of said web contact portion with said webbing.

11. The retractor of claim 1 wherein said clutch contact portion is moved by its bias towards said reel when said clutch means is in its second position, whereby said clutch contact portion is in position to engage said second portion of said clutch means and thereby prevent said first portion of said clutch means from blocking said pawl means when said clutch means moves to its third position.

* * * * *